Oct. 8, 1968         J. J. ABELL ET AL         3,405,206
         METHOD OF MAKING A MICROPOROUS SHEET MATERIAL
Filed Jan. 7, 1964                              2 Sheets-Sheet 2
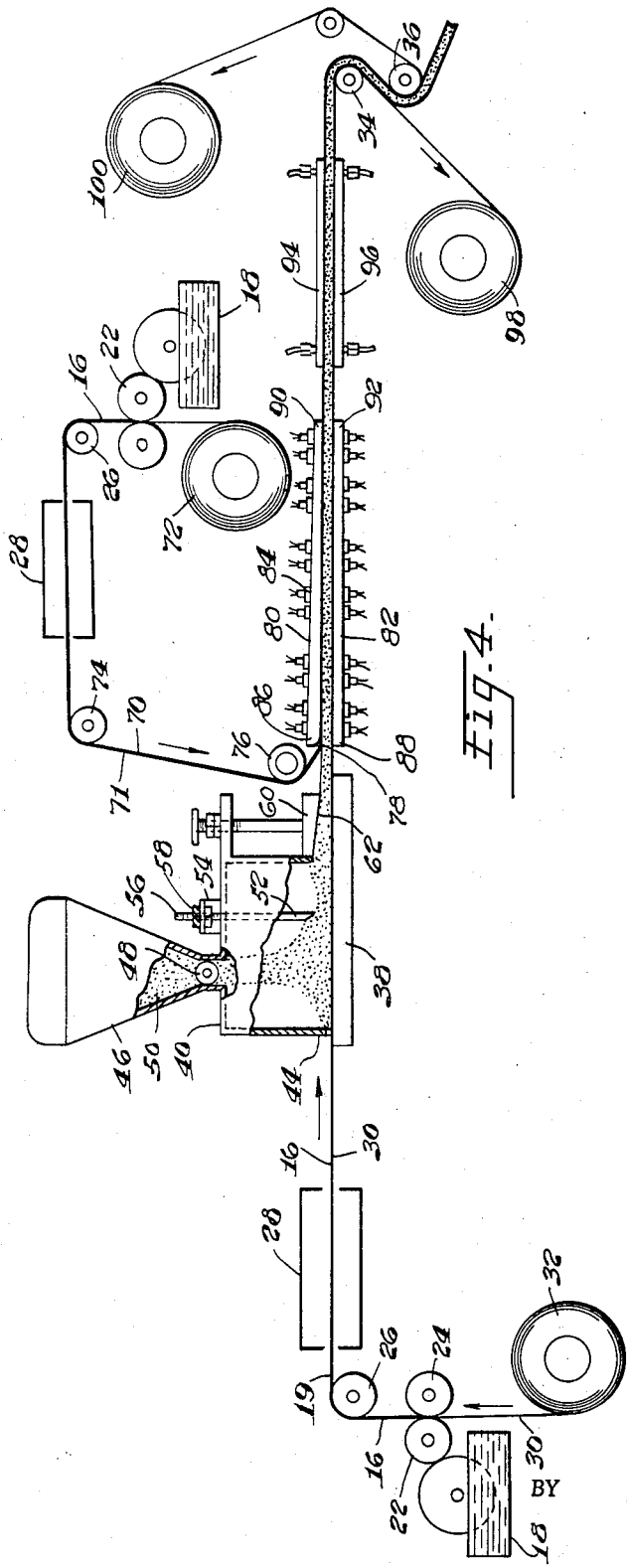
INVENTORS
Jerrold J. Abell
Bruce G. Kosa
BY Robert R. Churchill
ATTORNEY United States Patent Office 3,405,206
Patented Oct. 8, 1968

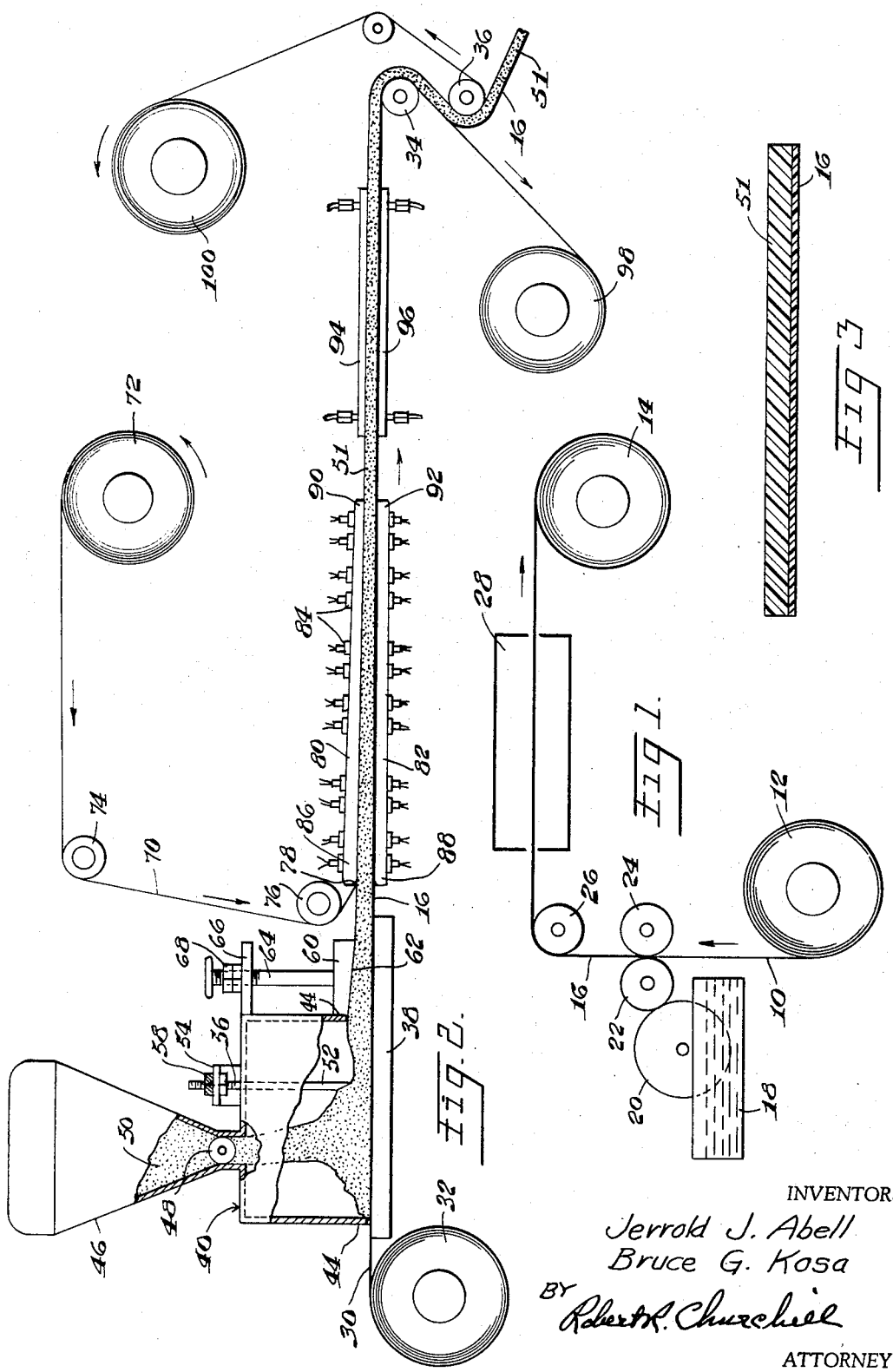

3,405,206
METHOD OF MAKING A MICROPOROUS
SHEET MATERIAL
Jerrold J. Abell, Manchester, and Bruce G. Kosa, Eastford, Conn., assignors to Rogers Corporation, Rogers, Conn., a corporation of Massachusetts
Filed Jan. 7, 1964, Ser. No. 336,234
5 Claims. (Cl. 264—112)

This invention relates to a novel and improved microporous sheet material and method of making the same, and particularly to such a material having a thin permeable coating.

These materials find utility in the manufacture of insoles, quarter linings in shoes, upholstery, and in rainwear wherein a material having a surface having low coefficient of friction as well as one which is readily cleanable as desired.

It is, therefore, a principal object of the present invention to provide a novel and improved microporous resin sheet material and method of making the same characterized by a surface having a lower coefficient of friction against fabric.

Another object of the invention is the provision of an improved resin material having a low friction, air and water vapor permeable surface, which is characterized by having a surface coating preventing migration of plasticizer to the surface.

A further object of the present invention is to provide a method of producing readily cleanable microporous resin sheet material in a continuous or semicontinuous manner.

Yet another object of the present invention is the provision of a composite low friction microporous sheet material including a backing sheet.

A still further object is to provide a method of coloring and improving the stiffness and texture of microporous resin sheet material.

These objects and other attendant advantages of the invention will become readily apparent as the same becomes better understood by reference to the following detailed description and drawings wherein:

FIG. 1 is a diagrammatic side view of an apparatus for precoating the carrier sheet;

FIG. 2 is a diagrammatic side view of apparatus for forming a coated microporous sheet;

FIG. 3 is an end view of the coated material;

FIG. 4 is a diagrammatic side view of apparatus for a continuous process of producing the doubly coated sheet material; and FIG. 5 is an end view of the material coated in accordance with the process of FIG. 4.

In accordance with the present invention the above objects and advantages are effected by providing said microporous resin sheet material with a thin permeable resinous coating which affords a barrier to plasticizer penetration to the surface of the sheet. In the usual method of manufacturing a microporous resin sheet material, granules of thermoplastic resin are deposited as a uniform layer on the surface of a carrier sheet and a cover sheet is laid down on top of the resin particle layer. This assembly is then passed between heated plates defining a passageway of diminishing thickness, the plates being heated to a temperature which will supply heat through the carrier and cover sheets to raise the temperature of the resin particles of the layer to sintering temperature within the time required for a given portion of the assembly to pass between the heated plates. The heated plates are spaced a distance apart at the entry corresponding substantially to the thickness of the assembly before heating and are spaced at the exit at a distance less than that at the entry to supply heat and pressure to sinter together the resin particles.

A particularly convenient manner of applying the coating of the present invention is to first apply the coating to the carrier or cover sheet and then transfer the same to the microporous sheet matrial during the formation of the sheet. This coating can be applied to the surface of the carrier or cover sheet as a step in the continuous process of forming the microporous sheet material, or rolls of carrier or cover material can be peviously coated. Alternatively, one surface of the microporous sheet material can be bonded to the other sheet of the assembly which can be a resin reinforced fibrous sheet to form a composite sheet material having a low friction, air permeable surface.

Fibrous sheets useful herein include porous resiliently compressible fiberboards, particularly rubber and/or resin impregnated fiberboards, woven fabrics, and non-woven fabrics. It is important that the fibrous sheets be of substantial strength and firmness and, where the sheets are to serve as permanent backing sheets in the final product, that they be capable of being bonded strongly to the microporous plastic sheet. It is further important that they be resistant to distortion under the temperature and pressure conditions encountered in sintering the plastic granules and bonding the fibrous sheets to the sintered sheet of plastic granules. Commercially available synthetic rubber impregnated fibrous sheet material of the kind used for inexpensive insoles, suitably from about .02 to about .06 inches in thickness has been found very satisfactory.

Referring now to the drawings, in the embodiment shown in FIG. 1, carrier sheet 10 is withdrawn from roll 12 by means of driven take-up roll 14 and is coated with a thin layer of material 16 as the sheet passes the coating station. The coating material 16 is transferred from tank 18 and applied to a surface of the sheet by transfer rolls 20, 22. The sheet passes from the transfer rolls 20, 22, between guide roll 24, around idler roll 26, through the drying oven 28, and is rewound on take-up roll 14. The carrier sheet can be any of the materials previously used in the formation of microporous sheet materials by sintering. However, since it is desired to transfer said coating to the layer of particulate resin, it is important that no substantial amount of the coating solution impregnate the carrier sheet. Of course, with metal carrier sheets no such problem arises, but when fibrous or resin impregnated or coated fibrous sheets are used, it is important that they be susbtantially impervious to the liquid coating formulation. A smooth, compacted fibrous surface is preferred and with silicone treated or clay-casein sized surfaces, impregnation by the coating solution is avoided. Alternatively, instead of modifying the fibrous surface the viscosity of the material can be increased by addition of conventional viscosity increasing agents, such as methyl cellulose. Resiliently compressible sheets are preferred since a sheet of better controlled porosity is obtained than when non-compressible metal sheets are utilized.

It appears that the reduction in rate of heat supplied to the particles of resin by reason of the insulating character of the fibrous sheets of the assembly prevents the sharp temperature differential which would exist between the temperature of resin particles in contact with a heated metal surface and the temperature of resin particles spaced from the metal surface. Thus, the particles in the resin layer with fibrous sheets are more nearly uniform in temperature so that sintering pressure forms a strong, uniformly sintered sheet. Also, because the surface granules are not overheated and because of the yielding nature of the fibrous sheet, the surface granules are not flattened out and hence, there is preserved a greater degree of porosity at the surface of the sintered resin sheet.

It is only necessary that the coating material have more affinity for the layer of resin particles than for the carrier. The resin coating is applied as a latex or emulsion and is partially or totally dried to drive off water, but is heated to a condition below that at which film formation would occur. Therefore, materials with high film-forming temperatures, above about 300° F., are preferred since drying can be safely accomplished in a shorter time. Preferably, the coating material contains polyvinyl chloride or acrylic resin as the film-forming ingredient. Other suitable polymers are polyvinylidine chloride, polyethylene, polyvinyl alcohol, natural and synthetic elastomers and phenol-formaldehyde resins. The coating should preferably be sufficiently thin to maintain the permeable character of the microporous resin material. Coatings of at least 0.5 gram per square foot are sufficient to afford the benefits of the invention; but, above 5 grams per square foot, the transfer of the material to the microporous resin substrate begins to adversely affect the porosity of the resin sheet. The application of 2 grams per square foot gives the optimum product.

In the embodiment shown in FIG. 2, a coated carrier sheet 30 coated by the previously described method is drawn from roll 32 and is pulled through successive stations by the driven reverse bend rolls 34 and 36 at the end of the sintering and transfer apparatus. From the roll 32 the sheet first passes over a rigid table 38 beneath a plastic granule spreading and initial compaction device. The device shown comprises an open bottomed box 40 of which the lower edges of the sides are joined to the table and the lower edge 44 of the entering end of the box is spaced from the table to provide a clearance for passage of the carrier sheet 30. A hopper 46 containing the plastic granules is mounted at the top of the box 40 and is fitted at its lower end with a feeder 48 which passes plastic granules 50 at a controllable rate into the box 40 and onto the moving carrier sheet 30 as it passes through the box. The granules on the carrier sheet are carried forward by the sheet 30 and are spread in an even layer at a desired thickness by the blade 52 which is supported by bracket 54 and is adjustable vertically by the threaded rod 56 and knurled nut 58. The blade 52 is adjusted to control the thickness of the layer of granules carried past it, and the feeder 48 is operated to maintain a small accumulation of granules before the blade 52 to insure that the carrier sheet is uniformly covered with granules to the desired depth. The thickness of the layer of granules passing the blade 52 is controlled to insure maintenance of a small accumulation of plastic granules at the exit of the box 40 before the initial compaction.

Thermoplastic resins suitable for use in the process of the present invention include vinyl resins, polyethylene, natural rubber and/or various synthetic rubbers, the various acrylic resins and other water-insoluble thermoplastic resins both natural and synthetic which either are flexible by nature or which can be flexibilized with suitable agents. These materials may be blended with each other and/or compounded with fillers, plasticizers, pigments or dyes, and the like according to well-known compounding techniques to provide suitable resilient compositions. Several of the materials, e.g., the vinyl chloride polymers, are obtainable in the form of fine particles suitable for sintering. A resin compound available in granule form and suitable for the production of a microporous sintered sheet material comprises 66.53 parts by weight of a copolymer of vinyl chloride and vinyl acetate in the ratio of 95:5, 32.25 parts by weight of a non-volatile plasticizer, 0.64 part by weight of a coloring agent and filler, 0.22 part by weight of a commercial wetting agent (e.g., "Tween 20") and 0.36 part by weight of bisphenol epichlorhydrin condensate. The condensate acts as a heat stabilizer for the copolymer, and the wetting agent is believed to aid movement of moisture through the microporous sintered sheet. Where the resins are not available in this form it is possible to subdivide masses of them to provide the desired particles. Product requirements dictate the size of particles to be sintered together. Using the plasticized granular resin compound described above, particles which are of a size to pass through a 30 mesh screen are preferred.

The layer of resin granules is carried by the carrier sheet 30 beneath the uniforming and initial compaction member 60 extending across the exit end of the box. This uniforming and compaction member is a rigid metal member having a smooth lower face 62 extending at a slight angle, which may be of the order of 10°, to the carrier sheet 30 to define with the carrier sheet a path of diminishing cross section. The lower face 62 may be, for example, 2″ wide so that the edge adjacent the box is 0.442″ further from the carrier sheet than is the opposite edge. Depending on the spacing of the face 62 from the carrier sheet, the thickness of the layer of granules may be from 3 to 8 times as great at the edge adjacent the box 40 as at the opposite end. The reduction in thickness is due largely to reduction of the amount of resin carried past the member; but the layer of granules is somewhat compacted and any voids in the layer are filled in in passing beneath the compaction member 60. The uniforming and initial compaction member 60 is carried by the rod 64 which is adjustable vertically in the bracket 66 by means of adjusting nuts 68. The uniforming and initial compaction member 60 is adjusted to spread the granules in a layer containing from about 0.05 to about 1.25 pound of resin per square foot of carrier sheet, preferably from 0.06 to 0.20 per pound per square foot.

Where a product with both surfaces coated is desired, cover sheet 70 can be the same as coated carrier sheet 30. Either the carrier or cover sheets can be metal, such as stainless steel provided at least one of them is coated according to the invention. It is also possible that one of these sheets can become a backing sheet for the microporous resin material by becoming bonded thereto.

Preferably, there is then provided on the surface of the fibrous sheet, a bonding agent which may comprise a deposit of resinous material which will permit passage of water vapor and/or air between the microporous sheet and the fibrous sheet. Thus, the bonding agent either should be in the form of a thin discontinuous film or layer on the fibrous sheet or should be of a chemical nature to permit transmission of water vapor through it. Discontinuous films or layers of bonding agent may be formed by depositing the bonding agent in discontinuous form, e.g., in strips, dots, or as individual particles. A preferred procedure for depositing the bonding layer is to spray a surface of the fibrous sheet with an aqueous dispersion, suitably a resin latex, of the bonding agent and thereafter to evaporate the water leaving a discontinuous deposit of bonding agent at the surface of the fibrous sheet. A 40% solids plasticizer vinyl chloride aqueous emulsion polymer latex has been found very satisfactory for this use, but other dispersions of thermoplastic resins compatible with the resin particles may be used. A deposit of from about ⅛ of an ounce to about one ounce of resin per square foot of a fiber sheet surface has been found satisfactory. Bonding agents having permeability to water vapor include the water vapor transmissive polyamide resins and the various polyelectrolyte resins, e.g., polyacrylate-acrylic acid and the like. The bonding agents useful herein may be thermoactive or pressure sensitive, and in the case of a bonding agent deposited in discontinuous form may comprise either a water vapor permeable material or any of the known resin and/or rubber compounds, synthetic resins, such as polystyrene, polyvinyl chloride, and copolymers of vinyl chloride, for example with vinyl acetate. Selection of a bonding agent for use in any particular system is within the skill of persons versed in the art.

As illustrated in FIG. 2, an uncoated cover sheet 70 is drawn from the roll 72, passes around the rolls 74, 76, and is brought down against the upper surface of the layer of resin granules by the rounded leading edge 78 of the plate 80. The assembly of cover sheet 70, layer of plastic granules 51 and carrier sheet 30 passes between the plates 80 and 82 which are heated to from about 200° to about 400° F. by the electrical heating units 84 to supply the heat required to sinter the plastic granules, and to transfer the coating from the carrier or cover sheet to the substrate and form an adherent film thereon. The plate 80 is spaced from the lower plate 82 at their leading ends 86 and 88 an amount greater than the spacing of the plates at the trailing ends 90 and 92 to reduce the thickness of the layer of plastic granules to provide a ratio of initial thickness to final thickness in the range of from about 4:1 to about 2:1. The greater the percentage compaction, the greater the increase in density and the lower the porosity.

The length of the heated plates 80 and 82 used will depend on the rate of movement of the assembly, the temperature of the plates, the thickness of the resin layer, the thickness of the carrier sheet 30 and cover sheet 70 and the sintering temperature of the resin. Using particles of a copolymer of vinyl chloride and vinyl acetate in a layer initially 0.085″ in thickness and finally 0.030″ in thickness, with cover and carrier sheets .05″ in thickness and plates heated to about 350° F., excellent results have been obtained with plates 8′ in length where the assembly moved between the plates at a rate of about 8.5′ per minute and with plates 4′ long where the assembly moved between the plates at 4′ per minute.

Where, in the form of the invention in which the carrier sheet carries a bonding agent at its surface, the heating of the assembly between the heating plates unites the sintered microporous layer 51 of plastic to the carrier sheet 30 in a strong bond. It has been found that the superior bonding coupled with desired retention of porosity in the microporous layer are obtained where the temperature of the lower plate 82, i.e., the plate adjacent the fibrous sheet carrying a bonding agent, is kept somewhat higher, for example about 15° to about 30° F., than that of the upper plate 80. For example, the lower plate may be heated to a temperature of about 360° F. and the upper plate to about 340° F. With the plates heated to these temperatures, the surface of the lower sheet adjacent the resin will reach 250° to 275° F., and the surface of the upper sheet adjacent the resin will be about 10° F. lower.

The assembly of the microporous sintered plastic layer 51, cover sheet 70 and carrier sheet 30 is then cooled. If a bonding agent has been included, one of the carrier sheets or cover sheets will be bonded to the plastic layer. The cooling is best accomplished between cold plates 94, 96 spaced apart a distance corresponding to the thickness of the assembly. In the apparatus shown, these plates may be, for example, 4′ long and maintained at a temperature of about 50 to 65° F. by cooling water passed therethrough.

From the cooling plates 94, 96, the assembly passes around the reverse bend driving rolls 34 and 36 which pull the assembly through the various stations. After passing the second driving roll 36, the carrier and cover sheets are pulled away from the microporous plastic layer 51 and are wound up on rolls 98, 100.

The continuous method of forming the novel improved product of the invention is illustrated in FIG. 4. This apparatus illustrates the continuous formation of a doubly coated product, but it should be understood that a singly coated or composite product can readily be continuously produced by elimination of either coating station and heater oven or by eliminating said station and oven and providing a bonding agent on said carrier or cover sheet. In the latter instance, a composite product is produced comprising the microporous resin sheet bonded to the carrier sheet, and only the cover sheet will be stripped off to leave a coated composite material.

In FIG. 4 carrier sheet 30 and cover sheet 70 are withdrawn from rolls 32 by means of driven reverse bend rolls 34 and 36 at the end of the sintering and transfer apparatus and are each coated with a thin layer of material 16 as the sheets pass the coating stations. The coating material 16 is transferred from tanks 18 and applied to the top surface 19 of the carrier sheet 30 and the bottom surface 71 of the cover sheet 70. The sheets then pass from the transfer roll 22 around roll 26 through drying oven 28.

The dried coated carrier sheet passes over a rigid table 38 beneath a plastic granule spreading and initial compaction device. The device shown comprises an open bottomed box 40 of which the lower edges of the sides are joined to the table and the lower edge 44 of the entering end of the box is spaced from the table to provide clearance for passage of the carrier sheet 30. A hopper 46 containing the plastic granules is mounted at the top of the box 40 and is fitted at its lower end with a feeder 48 which passes plastic granules 50 at a controllable rate into the box 40 and onto the moving carrier sheet 30 as it passes through the box 40. The granules 50 are carried forward by carrier sheet 30 and are spread in an even layer at a desired thickness by the blade 52 which is supported by bracket 54 and is adjustable vertically by the threaded rod 56 and knurled nut 58. The blade 52 is adjusted to control the thickness of the layer of granules carried past it and the feeder 48 is operated to maintain a small accumulation of granules before the blade 52 to insure that the carrier sheet is uniformly covered with granules to the desired depth. The thickness of the layer of granules passing the blade 52 is controlled to insure maintenance of a small accumulation of plastic granules at the exit end of the box 40 before the initial compaction.

The layer of resin granules is carried by the carrier sheet 30 beneath the adjustable uniform and initial compacting member 60 extending across the exit end of the box 40 and having a smooth lower face 62 extending at a slight angle to the carrier sheet to define a path of diminishing cross section as previously described in reference to FIG. 2.

The coated and dried cover sheet 70 is drawn from roll 72, passes around the rolls 74, 76 and is brought down against the upper surface of the layer of the resin granules by the rounded leading edge 78 of the plate 80. The assembly of cover sheet 70, plastic granules 51 and carrier sheet 30 passes between the plates 80 and 82 which are heated to from about 200° to 400° by the electrical heating units 84 to supply the heat required to sinter the plastic granules, effect transfer of the coatings from the cover and carrier sheets 70 and 30 and to bond the same as exterior films on the surfaces of the microporous layer. The plate 80 is spaced from the lower plate 82 at their leading ends 86 and 88 and an amount greater than the spacing of the plates 80, 82 at the trailing ends 90 and 92 to reduce the thickness of the layer of plastic granules to provide a ratio of initial thickness to final thickness in the range of about 4:1 to about 2:1.

The assembly of carrier sheet 30, microporous coated and sintered plastic layer 51 and cover sheet 70 is then cooled between spaced cooling plates 94, 96. From the cooling plates 94, 96 the assembly passes around reverse bend driving rolls 34 and 36 which pull the assembly through the various stations. After the second driving roll 36 both carrier and cover sheets have been pulled away from the doubly coated microporous sheet material and are wound up on rolls 98 and 100. It is to be understood that control of sintering and cooling conditions and apparatus dimensions are the same as previously described in connection with FIG. 2.

The invention is illustrated, but not limited by the following specific examples of the preparation of preferred coating formulations and their use according to the invention.

Example I

| Materials: | Parts by wt. |
|---|---|
| Geon 151 [1] | 100 |
| Alwax 253C [2] | 10 |
| Pigments | 1-3 |

[1] PVC-latex with a high film-forming temperature in excess of 300° F. manufactured by B. F. Goodrich.
[2] Microcrystalline wax emulsion manufactured by American Cyanamid Company.

Example II

| Materials: | Parts by wt. |
|---|---|
| Rhoplex HA-16 [3] | 111 |
| Oxalid acid | 0.11 |
| Amberlac 165 [4] | 100 |

[3] Hard, crosslinking acrylic latex having a film-forming temperature in excess of 300° F. manufactured by Rohm and Haas.
[4] Ammonium salt of an alkyd resin complex manufactured by Rohm and Haas.

All ingredients of the coating formulations are thoroughly dispersed, and a thin coating of 0.5 to 5 gms./ft.$^2$ preferably about 1 to 2 gms./ft.$^2$ is then applied to a carrier material by means such as a roller coater as previously described or by means of a doctor blade for the more viscous materials. It is believed that the Alwax acts as an extender to improve the continuity of the Geon film. The oxalic acid is believed to be an acidic curing catalyst and the Amberlac a hardner for the Rhoplex resin.

The coated carrier is then dried under conditions assuring that the film-forming ingredients do not reach their film-forming temperatures. The drying can be effected at room temperature for 30 minutes, but is preferably at temperatures of about 200° F. to 230° F. from 5 to 2 minutes, respectively. It has been found that drying can be conducted in one minute at 320° F., but the possibility of the material bubbling and permanently adhering to the carrier sheet is a consideration at this temperature.

The coated carrier material is then passed through the apparatus of FIG. 2 to produce a singly coated product illustrated in FIG. 3 having a coating 16 on one surface, or two such sheets are continuously coated and passed through the apparatus of FIG. 4 to produce the doubly coated product illustrated in FIG. 5 as sintered product 51 and air permeable non-friction coatings 16.

Singly coated products containing coatings of Example I or Example II provide resistance to plasticizer migration, provide color, modify the texture of the substrate or lower the coefficient of friction. The coated materials still exhibit the air permeability of the substrate material which will still transmit moisture-laden vapor. The coating of Example II increases the stiffness of the substrate. The presence of plasticizer migration is illustrated in the following table in comparison to uncoated microporous sheet material produced under identical conditions. These products were aged up to 23 days at 130° F., and the coefficient of friction against a moving cloth surface was recorded at intervals as per ASTM D 1894-61T, procedure A.

KINETIC COEFFICIENT OF FRICTION

| | Days at 130° F. | | |
|---|---|---|---|
| | 0 | 6 | 23 |
| Control | .9 | | |
| Coating 1 | .47 | .57 | .67 |
| Coating 2 | .45 | .37 | .40 |

It is apparent that the coated products of Examples 1 and 2 have a much lower coefficient of friction than the uncoated product. The appearance of the uncoated product was extremely poor whereas the coated products even after 23 days at high temperature still had pleasing appearance and exhibited a low coefficient of friction. The surface of the control sample had deteriorated to such an extent after 6 days at 130° F. that the coefficient of friction measurements could not be made.

From the foregoing description it will be apparent that the present invention provides a novel and improved microporous material and method of making the same wherein the surface has a low coefficient of friction and is readily cleavable. It will be apparent that many modifications and variations may be effected without departing from the spirit of the present invention, and the illustrative details disclosed are not to be construed as imposing unnecessary limitations on the invention.

Having thus described the invention, what is claimed is:

1. The method of manufacturing a microporous layer of plasticized vinyl chloride polymer resin comprising the steps of spreading fine granules of said resin in a uniform layer on the surface of one of two sheets covering the exposed surface of said uniform layer with the other of said sheets, at least one of the surfaces of said sheets adjacent to said layer being coated with 0.5 to 5 grams per square foot of an air permeable, resinous material containing as a film-forming ingredient a member selected from the group consisting of polyvinyl chloride and acrylic resins having a film-forming temperature above 300° F. and being dried at a temperature below said film-forming temperature, passing the resultant assembly between heated plates defining a passageway diminishing in thickness from a thickness at the entry to the passageway approximating the initial thickness of said assembly to a thickness less than said initial thickness at the exit of said passageway, said heated plates being at a temperature of from about 200° to about 400° F. and supplying heat and pressure to said assembly to sinter the resin granules together into a microporous layer and at the same time to transfer said coating from said sheet and bond it to the surface of said layer, cooling said assembly and stripping the sheets from the coated microporous resin layer.

2. The method of manufacturing a microporous sheet of plasticized vinyl chloride-vinyl acetate copolymer resin affording through passage of air from one face to the other which comprises the steps of distributing on the surface of one of two resiliently compressible sheets, fine granules of said resin, moving said sheet and resin particles thereon through a path of diminishing cross section to lightly compact said granules and form them into a uniform layer, covering the exposed surface of said layer with the second of said sheets, at least one of the surfaces of said sheets adjacent to said layer being coated with 1 to 2 grams per square foot of an air permeable resinous composition having a film-forming temperature above 300° F., the film-forming ingredient being selected from the group consisting of polyvinyl chloride and acrylic resins and said coating being dried at a temperature from 200° F. to 230° F. for a period from 5 to 2 minutes, passing the resultant assembly between heated plates defining a passageway diminishing in thickness from a thickness at the entry to the passageway approximating the initial thickness of said assembly to a thickness less than said initial thickness at the exit of said passageway, the diminution in thickness compressing said layer of granules to provide a ratio of original thickness to ultimate thickness in the range of about 4:1 to 2:1, said heated plates being at a temperature of from about 200° F. to about 400° F. and supplying heat and pressure to said assembly to sinter the resin granules together into a microporous layer and at the same time to transfer said coating from said sheet and bond it as a film on the surface of said layer, cooling said assembly and stripping said sheets from said microporous layer.

3. The method of manufacturing a microporous air and water vapor permeable layer of plasticized vinyl chloride-vinyl acetate copolymer resin which comprises the steps of applying to a relatively impermeable surface of at least one of two resiliently compressible sheets 1.0 to 2 grams per square foot of an air permeable, releasable low friction coating selected from the group consisting of polyvinyl and acrylic resins having a film-forming temperature in excess of 300° F., drying said coated sheet at a temperature of from 70° F. to 320° F. and for a period of from 30 to 1 minutes without allowing said coating to become heated to its film-forming temperature, distributing fine granules capable of passing a 30 mesh screen of plasticized vinyl chloride-vinyl acetate copolymer resin on one of said sheets, moving said sheet and resin granules thereon through a path of diminishing cross section to lightly compact said granules and form them into a uniform layer, covering the exposed surface of said layer with the other of said sheets, passing the resultant assembly between heated plates defining a passageway diminishing in thickness from a thickness at the entry to the passageway approximating the initial thickness of said assembly to a thickness less than said initial thickness at the exit of said passageway, the diminution in thickness compressing said layer of granules to provide a ratio of original thickness to utlimate thickness in the range of about 4:1 to 2:1, said heated plates being at a temperature of from about 200° F. to about 400° F. and supplying heat and pressure to said assembly to sinter the resin granules together into a microporous layer and at the same time to transfer said coating from said sheet and bond it as a film on the surface of said layer, cooling said assembly and stripping said sheets from said microporous layer.

4. The method of manufacturing a microporous air and water vapor permeable sheet of plasticized vinyl chloride-vinyl acetate copolymer resin having low affinity to lint and foreign matter comprising the steps of applying to the surface of a silicone treated fibrous sheet one to two grams per square foot of an air permeable, releasable low friction coating containing as film-forming ingredient a member selected from the group consisting of polyvinyl chloride and acrylic resins, drying said coating at a temperature of from 200° to 230° F. over a period from 5 to 2 minutes, distributing on said sheet fine granules capable of passing a 30 mesh screen of plasticized vinyl chloride-vinyl acetate copolymer resin, moving said sheet and resin granules thereon through a path of diminishing cross section defined by a pair of surfaces of which one is inclined to the other at an angle of about 10° to lightly compact said granules and form them into a uniform layer containing from about 0.05 to 1.25 pounds of resin per square foot of sheet, laying down on the exposed surface of said layer a second sheet, passing the resultant assembly between heated defining a passageway of diminishing thickness the difference between the initial thickness and the final thickness of said passageway being from about 50% to about 75% of the initial thickness of said uniform layer, said plates being at a temperature of from about 200° F. to about 400° F. and supplying heat and pressure to said assembly to sinter the resin granules together into a microporous layer and at the same time to transfer said coating from said sheet and bond it as a film on the surface of said microporous layer, cooling said assembly and stripping the sheets from said microporous layer.

5. The method of manufacturing a composite sheet including a backing sheet and a microporous layer of plasticized vinyl chloride-vinyl acetate copolymer resin which comprises the steps of spreading fine granules of said thermoplastic resin in a uniform layer on the surface of one of two sheets, covering the exposed surface of said layer with the other of said sheets, one of said sheets being a porous, resiliently compressible fiberboard, the surface of said fiberboard sheet adjacent said layer being coated with a deposit of resinous bonding agent which will permit passage of vapor, said bonding agent being a member selected from the group consisting of polyvinyl chloride, a polyamide resin, a polyacrylic resin, rubber, polystyrene, and a copolymer of vinyl chloride and vinyl acetate, and the surface of the other sheet adjacent said layer being coated with a thin, air permeable, low friction resinous composition selected from the group consisting of polyvinyl chloride and acrylic resins having a high film-forming temperature, passing the resultant assembly between heated plates defining a passageway diminishing in thickness from a thickness at the entry of the passageway approximating the initial thickness of said assembly to a thickness less than said initial thickness at the exit of said passageway, said heated plates being at a temperature of from about 200° F. to about 400° F. and supplying heat and pressure to said assembly to sinter the resin granules together into a microporous layer and at the same time to bond said microporous layer to the surface of the fiberboard sheet layer coated with said resinous bonding agent and to transfer the coating from said other sheet and bond it as a film to the surface of said microporous layer, cooling said assembly and stripping said other sheet from said microporous layer.

References Cited

UNITED STATES PATENTS

| | | | |
|---|---|---|---|
| 3,076,234 | 2/1963 | Paulus | 156—247 XR |
| 2,453,052 | 11/1948 | Van Etten | 161—88 XR |
| 2,559,649 | 7/1941 | Little et al. | 156—238 |
| 3,067,469 | 12/1962 | Yarrison | 156—247 |
| 3,198,682 | 8/1965 | Hassel et al. | 156—306 |
| 2,893,908 | 7/1959 | Antlfinger | 161—242 |

OTHER REFERENCES

Wakeman, R. L., The Chemistry of Commercial Plastics, Rheinhold, New York, 1947 p. 4.

EARL M. BERGERT, *Primary Examiner.*

W. E. HOAG, *Assistant Examiner.*